No. 766,565. PATENTED AUG. 2, 1904.
A. W. WILSON.
FISHING GEAR.
APPLICATION FILED APR. 2, 1904.
NO MODEL.
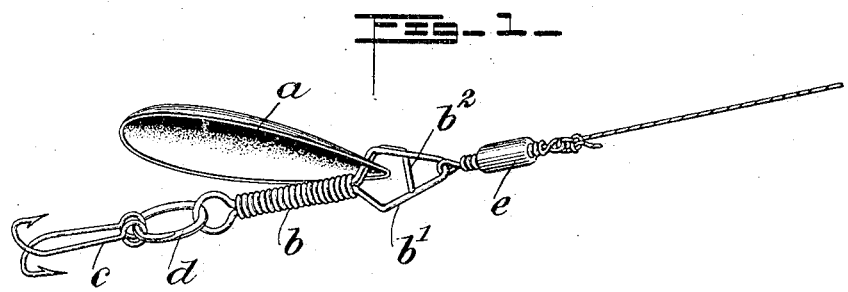
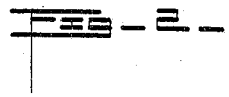
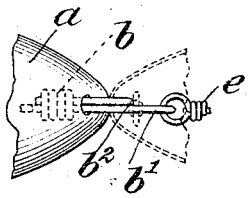
WITNESSES:
INVENTOR
Albert W. Wilson
BY
ATTORNEYS No. 766,565. Patented August 2, 1904.

UNITED STATES PATENT OFFICE.

ALBERT WING WILSON, OF SAN FRANCISCO, CALIFORNIA.

FISHING-GEAR.

SPECIFICATION forming part of Letters Patent No. 766,565, dated August 2, 1904.

Application filed April 2, 1904. Serial No. 201,234. (No model.)

*To all whom it may concern:*

Be it known that I, ALBERT WING WILSON, a citizen of the United States, and a resident of San Francisco, in the county of San Francisco and State of California, have invented a new and Improved Fishing-Gear, of which the following is a full, clear, and exact description.

This invention relates particularly to that class of fishing devices in which a spoon is connected with the hook and the latter adapted to be trolled through the water, so that the spoon attracts fish, causing the fish to take the hook. In my prior patent, No. 730,064, dated June 2, 1903, a device of this general character is disclosed.

The present invention has for its object to avoid possible disarrangement of the spoon with respect to the link and swivel, which end I attain by my construction of the link, which will be hereinafter fully set forth.

This specification is an exact description of one form of my invention, while the claims define the precise scope thereof.

Reference is to be had to the accompanying drawings, forming a part of this specification, in which similar characters of reference indicate corresponding parts in all the views.

Figure 1 is a perspective view showing the device in operative position. Fig. 2 is a fragmentary view of the forward end of the spoon, illustrating its connection with the link and showing the spoon in two positions by full and dotted lines, respectively, said view also indicating the outer end of the swivel in two positions; and Fig. 3 is a view similar to Fig. 2, excepting that the parts are shown in side elevation.

$a$ indicates the spoon; $b$, the link; $c$, the hooks, connected with the outer end of the link $b$ by the split ring $d$; and $e$, the swivel. All of these parts, excepting the link, may be of any construction. The link is formed at its forward or inner end with an eye $b'$, which is connected with the front end of the spoon $a$ by passing it through an orifice in the spoon and which is also connected with one of the ends of the swivel $e$. The said eye $b'$ is divided by a cross-bar $b^2$, extending, essentially, transversely of the length of the link, the swivel being confined by the bar at the front portion of the eye $b'$ and the spoon being confined at the rear portion of the eye. By means of this peculiarly-constructed eye it is impossible for the spoon to fall forward or toward the swivel sufficiently to become entangled therewith or to turn on the link so as to lose its proper relative position to the hook $c$. The cross-bar $b^2$ of the eye further operates to prevent excessive rearward sliding of the swivel. By reason of this construction a hook of any length or under any reasonable conditions can be made without any danger of entanglement due to the presence of the spoon alongside of the link.

Various changes in the form, proportions, and minor details of the invention may be resorted to at will without departing from the spirit thereof. Hence I consider myself entitled to all such variations as may lie within the scope of the claims.

Having thus described my invention, I claim as new and desire to secure by Letters Patent—

1. The combination of a link having an eye with a cross-bar therein, a spoon engaged with the eye at one side of the cross-bar, a swivel engaged with the eye at the other side of the cross-bar, and a hook in connection with the link.

2. The combination of a link having an eye with a cross-bar therein, a spoon engaged with the eye at one side of the cross-bar, a swivel engaged with the eye at the other side of the cross-bar, and a hook in connection with the link, the said eye being located at the forward end of the link and the hook being in connection with the outer or rear end.

3. A link for fishing-gear, provided with an eye having a cross-bar therein.

4. The combination of means forming an eye, with a cross-bar therein, means for connecting the line with the eye at one side of the cross-bar, a spoon connected with the eye at the other side of the cross-bar, and means for connecting the hook with the eye.

5. In fishing-gear, the combination of an eye having a cross-bar therein and two elements of the gear connected with the eye respectively at opposite sides of the cross-bar.

In testimony whereof I have signed my name to this specification in the presence of two subscribing witnesses.

ALBERT WING WILSON.

Witnesses:
ALEXANDER V. VOGELSANG,
EUGENE W. LEVY.